United States Patent Office 3,264,364
Patented August 2, 1966

3,264,364
HYDROGENATION PROCESS
William A. Hewett, Oakland, and Alfred J. Canale, Orinda, Calif., assignors to Shell Oil Company, New York, N.Y., a corporation of Delaware
No Drawing. Filed Aug. 27, 1962, Ser. No. 219,745
4 Claims. (Cl. 260—683)

This invention relates to the hydrogenation of organic compounds, and to a novel catalyst employed in such hydrogenation. More particularly, the invention relates to the hydrogenation of olefinic hydrocarbons employing a novel metal fluoride catalyst.

INTRODUCTION

Hydrogenation is one of the fundamental operations of chemical technology, and the art relating to the hydrogenation of various chemical functions is extensive. In general, the reaction between any particular chemical compound and hydrogen is conducted in the presence of a catalyst, and at elevated temperature and pressure, so that accelerated reaction rates may be obtained.

Historically, the earliest hydrogenation catalysts employed were reduced metals, particularly nickel, copper, platinum and palladium. It was soon observed that metal oxides showed superior resistance to poisoning and better selectivity; metal sulfides were also effective. Examples of such materials are "copper chromite" (mixed copper oxide-chromium oxide) and molybdenum and tungsten sulfides. Such catalysts are insoluble in the hydrogenation system and are therefore employed in dispersed or fixed bed form. Because of the necessity of rendering the catalyst stable to heat and mechanical forces, many hydrogenation catalysts are used dispersed on solid inert refractory supports. These materials are removed from the hydrogenation zone as they become posioned, and are replaced with fresh catalyst, the withdrawn catalyst being discarded or, more frequently, regenerated.

The use of solid metal fluorides with hydrogenation catalysts is known in the art. For example, in U.S. Patent 1,216,933, issued February 20, 1917, Bosch et al. teach the preparation of intimate mixtures of such metals as iron, nickel, cobalt and copper with the fluorides of alkali metal or alkaline earth metals; the resulting insoluble catalysts are said to be effective for hydrogenation and dehydrogenation of organic compounds. Metal halides are disclosed by Frey, U.S. Patent 2,418,023, issued March 25, 1947, to be useful as accelerators in the hydrogen fluoride-catalyzed hydrogenation of petroleum hydrocarbons. Solid oxide-supported molybdenum-cobalt compound catalysts containing combined halogen are reported by Holden in U.S. Patent 2,813,837, issued November 19, 1957, to be effective as purification catalysts for organic compounds, particularly hydrocarbons. Such solids are employed dispersed in the organic phase containing the compound to be hydrogenated.

OBJECTS

It is an object of the present invention to provide a novel and improved catalytic process for the hydrogenation of organic compounds. Another object of the invention is the provision of a catalytic process for the hydrogenation of olefinically-unsaturated hydrocarbons. Other objects of the invention will be apparent from the following detailed description of the invention.

STATEMENT

The process of the invention comprises reacting a hydrogenatable organic compound with hydrogen in the presence of an inert polar liquid, especially a hydroxylic liquid such as water or a saturated alcohol containing in solution a catalytic amount of a mixture of cobalt fluoride and alkali metal fluoride.

DESCRIPTION

The process of the invention comprises hydrogenating a hydrogenatable organic compound in the presence of a novel catalytic system. The catalytic system differs from those of the art in that in the system of the invention, the catalyst is employed in solution in an inert polar liquid solvent, especially an aqueous system. As a consequence, the catalyst system is more readily handled than are the solid insoluble catalysts of the art, and contact between the hydrogenated compound, hydrogen and the catalyst is materially enhanced.

The catalyst system is prepared by dissolving cobalt fluoride and alkali metal fluoride in the polar solvent, e.g., water. The cobalt fluoride employed is cobaltous fluoride, $CoF_2$, and while any proportions of $CoF_2$ and NaF or KF may be employed in the aqueous catalyst system, substantially equimolar amounts have shown the best results. For this reason, the use of substantially equimolar quantities of $CoF_2$ and alkali metal fluoride (MF) in an aqueous catalyst system is preferred.

The mixed metal fluorides are effective in extremely low concentration. From about 0.001% w. to about 0.1% w. of the mixed fluoride catalyst in aqueous solution gives excellent results, although greater or lesser concentrations are effective. In general, only sufficient cobalt fluoride and alkali metal fluoride are required in aqueous solution to bring about the desired rate of hydrogenation under the particular conditions chosen.

In the process of the invention, the hydrogen is reacted with the hydrogenatable organic compound while both reactants are in contact with the aqueous system containing the dissolved cobalt fluoride-alkali metal fluoride catalyst. By hydrogenatable organic compound is meant an organic compound having a non-aromatic unsaturation, such as an olefinic double bond or an acetylenic triple bond connecting two carbon atoms, a carbonyl group as in aldehydes and ketones, a nitrile as in acetonitrile, imino groups such as in pyridine and ethylene imine, and epoxy groups, such as in ethylene and propylene oxide and epichlorohydrin. While the organic compound may have in addition other functional groups, preferred compounds are unsaturated hydrocarbons, particularly those having up to two unsaturated carbon-to-carbon linkages. Examples of such compounds are the alkenes, including cycloalkenes, such as ethylene, propylene, butene, pentene, hexene, isobutene, cyclopentene, cyclohexene, heptene, octene, and decene; and the dienes, including butadiene, pentadiene, cyclopentadiene, hexadiene, heptadiene, octadiene and decadiene. Such alkynes as acetylene, vinyl acetylene, methyl acetylene, dimethyl acetylene, pentine, hexine, octadecine and the like, may also be hydrogenated by the process of the instant invention. Preferred hydrocarbons are those having from 2 to 20 carbon atoms, arranged in a normal or branched chain, while particularly preferred hydrocarbons are those of up to ten carbon atoms.

The present invention is particularly useful in the hydrogenation of water-insoluble organic compounds. However, it is also useful and often advantageous for the hydrogenation of water-soluble compounds, such as unsaturated alcohols (e.g., allyl and crotyl alcohols), unsaturated acids (e.g., acrylic and methacrylic acids), unsaturated ethers, aldehydes such as acetaldehyde, propionaldehyde, acrolein, glucose and glycidaldehyde, and the like.

The reaction is conducted under hydrogenation conditions. One outstanding feature of the invention is that the hydrogenation of the organic compound proceeds readily under relatively mild conditions, only fairly low temperatures and hydrogen pressures being required for the reaction to take place rapidly. Temperatures as low as about 25° C. may be employed, although preferred temperatures are those from about 50° C. to about 150° C.

Superatmospheric hydrogen pressures are best suited for conduct of the process. While elevated pressures may be employed, pressures as low as 50 p.s.i.g. are effective. Pressures from about 100 p.s.i.g. to 3000 p.s.i.g. are most convenient, while pressures as high as 10,000 p.s.i.g. may, if desired, be employed.

The hydrogenation is carried out by dispersing the organic compound and the hydrogen in the polar liquid system containing the mixed cobaltous fluoride-alkali metal fluoride catalyst under hydrogenation conditions. This may be effected by passing the organic compound and hydrogen through a zone containing the polar liquid catalyst system maintained at suitable temperature and pressure, recovering the hydrogenated product, and recycling the unhydrogenated starting material.

Another convenient mode of hydrogenating the organic material is to disperse it in the aqueous system and subject the resulting emulsion to hydrogen under hydrogenating conditions. When the organic material and the aqueous system are relatively immiscible, they may easily be separated after hydrogenation and both the aqueous system and unhydrogenated organic material recycled. The aqueous system is preferably predominantly water, but it may advantageously contain a substantial portion of water soluble, at least difficultly-hydrogenatable organic compounds, especially alcohols, such as methanol, ethanol, t-butanol, ethylene glycol, methoxyethanol and hydrotropic agents such as sodium xylene sulfonate, potassium isobutyrate and potassium cresylate.

The emulsion hydrogenation system lends itself readily to either batch or continuous processing methods. If desired, the hydrocarbon-aqueous catalyst emulsion may be stabilized with the aid of an appropriate surface-active agent, with mechanical mixing, or by a combination of both methods. Surface-active agents employed may be anionic, cationic or non-ionic in nature. Representative anionic surface-active agents include the alkyl aryl sulfonates, the fatty alcohol sulfates, the esters of sodium sulfosuccinic acid, the sodium salts of sulfated glycerides, and the like. Typical cationic surface-active agents are the quaternary ammonium salts of fatty amines. Non-ionic surface-active agents are exemplified by ethoxylated alkyl phenols or fatty alcohols.

The anionic surface-active agents have been found to be particularly effective for stabilizing the emulsified hydrogenation systems of the invention. Particularly preferred are the alkyl aryl sulfonates. Typical commercial sulfonates of this class are tabulated below:

Alkanol B—Sodium alkylnaphthalene sulfonate
Detergent D-40—Sodium alkylbenzene sulfonate
Leonil SA—Sodium dibutylnaphthalene sulfonate
Santomerse No. 1—Sodium dodecylbenzene sulfonate
Nacconol NR—Sodium dodecylbenzene sulfonate
Siponate DS-10—Sodium dodecylbenzene sulfonate The surface-active agent is required only in amount sufficient to stabilize the catalyst solution-hydrocarbon emulsion, from about 0.01% w. to about 5% w., based on the water, being sufficient for most purposes.

The process is advantageously carried out by passing the aqueous catalyst and the hydrogenatable compound concurrently through a bed of inert particulate material while passing hydrogen therethrough either concurrently or countercurrently to the aqueous and organic phases.

When the hydrogenation is completed, the organic compound and the catalyst system are removed from the hydrogenation zone and separated. When a water-immiscible hydrocarbon is the treated organic material, the starting material and product are water-immiscible and may readily be decanted from the aqueous catalyst system as the upper layer. When the hydrocarbons are of low molecular weight, e.g., ethylene, ethane, propylene, propane, butadiene, butylene, butane, they are sufficently more volatile than the water phase that they may be separated from the aqueous catalyst system by distillation or flashing. The water phase, containing the dissolved cobalt fluoride-alkali metal fluoride and, if desired, emulsifying agent, is then recovered and recycled.

An important advantage of the present invention is that the dissolved catalyst system may be readily used, recovered, recycled and reused without change. No valence change is effected in the cobaltous ion in the course of the hydrogenation, and there is consequently no necessity for regeneration of the catalyst system prior to reuse. Since the catalyst system exists as a true aqueous solution, it may easily be filtered or otherwise mechanically purified to separate immiscible or insoluble contaminants. Since the catalyst system is in aqueous form, it is particularly unsusceptible to poisoning by components of the organic phase.

To illustrate the novel catalyst system and hydrogenation process of the invention, the following examples are given. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

*Examples I–III*

Three runs were made in an 87 cc. Inconel Reactor. The runs were carried out under hydrogen pressure and at 50° C. In each run, the aqueous catalyst system was prepared by dissolving 0.068 g. cobaltous fluoride and 0.0294 gram sodium fluoride in 20 ml. of water containing 0.6 gram Siponate DS-10 (sodium dodecyl benzene sulfonate).

Prior to each run the reactor was flushed with butadiene for 30 minutes. The degassed aqueous solution was then charged to the reactor and 7.5 ml. of butadiene under hydrogen added thereto by syringe. The reactor was then pressured to 700 p.s.i.g. with hydrogen at 50° C.

At the end of 48 hours, the reactor in one typical run was vented and the contents collected. The hydrocarbon contents consisted of a small amount (0.15 gram) of solids and a 69% yield of hydrogenated $C_4$ hydrocarbons of the following distribution determined by gas chromatography.

| Product: | Percent |
|---|---|
| n-Butane | 32 |
| 1-butene | 26 |
| Trans-2-butene | 19 |
| Cis-2-butene | 23 |

A similar degree of conversion to ethane was obtained when ethylene was hydrogenated in a comparable aqueous system.

*Example IV*

Glycidaldehyde (8.3 g.) was hydrogenated in the same reactor as used in Examples I–III, with a system of 20 ml. of water containing 0.068 g. $CoF_2$ and 0.0294 g. of NaF, by pressuring to 700 p.s.i.g. at 100° C. After 3 hours the pressure had dropped to 80 p.s.i.g. Analysis showed that the glycidaldehyde had been converted about 50% to glycerine with the rest polymer.

We claim as our invention:

1. A hydrogenation process utilizing a liquid catalyst system comprising contacting a $C_2$ to $C_{20}$ olefinically unsaturated hydrocarbon with hydrogen in the presence of water containing a catalytic dissolved amount of an equimolar mixture of cobalt fluoride and alkali metal fluoride, said contact being effected at a temperature from 25° to 150° C. and at a pressure from 50 to 10,000 p.s.i.g.

2. A hydrogenation process utilizing a liquid catalyst system comprising contacting a $C_2$ to $C_{10}$ aliphatic olefinically unsaturated hydrocarbon with hydrogen in intimate contact with water containing from 0.001 to 0.1% by weight of an equimolar mixture of cobalt fluoride and alkali metal fluoride dissolved therein, said contact being effected at a temperature from 25° to 150° C. and at a pressure from 50 to 10,000 p.s.i.g.

3. A process according to claim 2 in which the alkali metal fluoride is sodium fluoride.

4. A hydrogenation process according to claim 2 in which the $C_2$ to $C_{20}$ aliphatic olefinically unsaturated hydrocarbon is butadiene.

References Cited by the Examiner

UNITED STATES PATENTS

| | | | |
|---|---|---|---|
| 1,216,933 | 2/1917 | Bosch et al. | 260—638 |
| 2,448,047 | 2/1947 | Peppel | 260—638 |
| 2,614,107 | 10/1962 | Wender | 260—638 |

LEON ZITVER, *Primary Examiner.*

M. B. ROBERTO, G. A. MILWICK, B. HELFIN,
*Assistant Examiners.*